United States Patent
Johnson

(10) Patent No.: US 6,684,621 B1
(45) Date of Patent: Feb. 3, 2004

(54) JET ENGINE IGNITER LEAD ELBOW ASSEMBLY

(76) Inventor: Howard R. Johnson, 1591 E. El Segundo Blvd., El Segundo, CA (US) 90245

( * ) Notice: Subject to any disclaimer, the term of this patent is extended or adjusted under 35 U.S.C. 154(b) by 0 days.

(21) Appl. No.: 10/199,181

(22) Filed: Jul. 19, 2002

(51) Int. Cl.⁷ .............................. F02G 7/266; F23Q 3/00
(52) U.S. Cl. .............................. 60/39.821; 60/39.827; 361/253
(58) Field of Search .................... 60/39.821, 39.826, 60/39.827, 39.828; 361/253

(56) References Cited

U.S. PATENT DOCUMENTS

| | | | |
|---|---|---|---|
| 1,524,261 A | 1/1925 | Kusterle | |
| 1,984,172 A | 12/1934 | Brownley | |
| 1,996,422 A | 4/1935 | Hurley | |
| 2,114,750 A | 4/1938 | Stone | |
| 2,147,431 A | 2/1939 | Ewing | |
| 2,398,359 A | 4/1946 | Curtiss | |
| 2,399,402 A | 4/1946 | Spengler | |
| 2,442,015 A | 5/1948 | Peters et al. | |
| 2,463,924 A | 3/1949 | Van Orden | |
| 2,731,933 A | 1/1956 | Phillips | |
| 2,811,676 A | * 10/1957 | Smits | 361/257 |
| 3,146,301 A | 8/1964 | Logan | |
| 3,618,526 A | * 11/1971 | Baker | 102/201 |
| 3,979,809 A | 9/1976 | Schneider | |
| 4,215,979 A | 8/1980 | Morishita | |
| 4,926,088 A | 5/1990 | Kler | |
| 4,938,019 A | 7/1990 | Angell et al. | |
| 5,085,040 A | * 2/1992 | Tilston | 60/39.827 |
| 5,367,871 A | * 11/1994 | Venkataramani et al. | 60/39.821 |
| 5,402,637 A | * 4/1995 | Adam | 60/39.827 |
| 5,628,180 A | 5/1997 | DeFreitas | |
| 6,073,658 A | 6/2000 | Bailey | |
| 6,311,475 B1 | 11/2001 | Ngo-Beelman et al. | |

\* cited by examiner

*Primary Examiner*—Charles G. Freay
(74) *Attorney, Agent, or Firm*—David A. Belasco; Belasco Jacobs & Townsley, LLP

(57) ABSTRACT

A jet engine igniter lead elbow assembly includes a hollow saddle adapter with a semi-circular cutout at one end, a master cylinder, an extension tube, a ferrule and a nut extension tube. The master cylinder is hollow, having a perpendicular circular orifice adjacent a closed end. The semi-circular cutout is shaped to fit over the circular orifice. The lower end of the master cylinder attaches to the top end of the extension tube. The bottom end of the extension attaches to the first end of the ferrule. The saddle adapter is attached to the master cylinder at the semi-circular cutout, the extension tube is then attached to the lower end of the master cylinder. The nut extension tube is slipped over the extension tube and the ferrule is then attached. The preferred method of attachment is silver soldering as it permits removal and replacement of the component parts without damage.

7 Claims, 4 Drawing Sheets

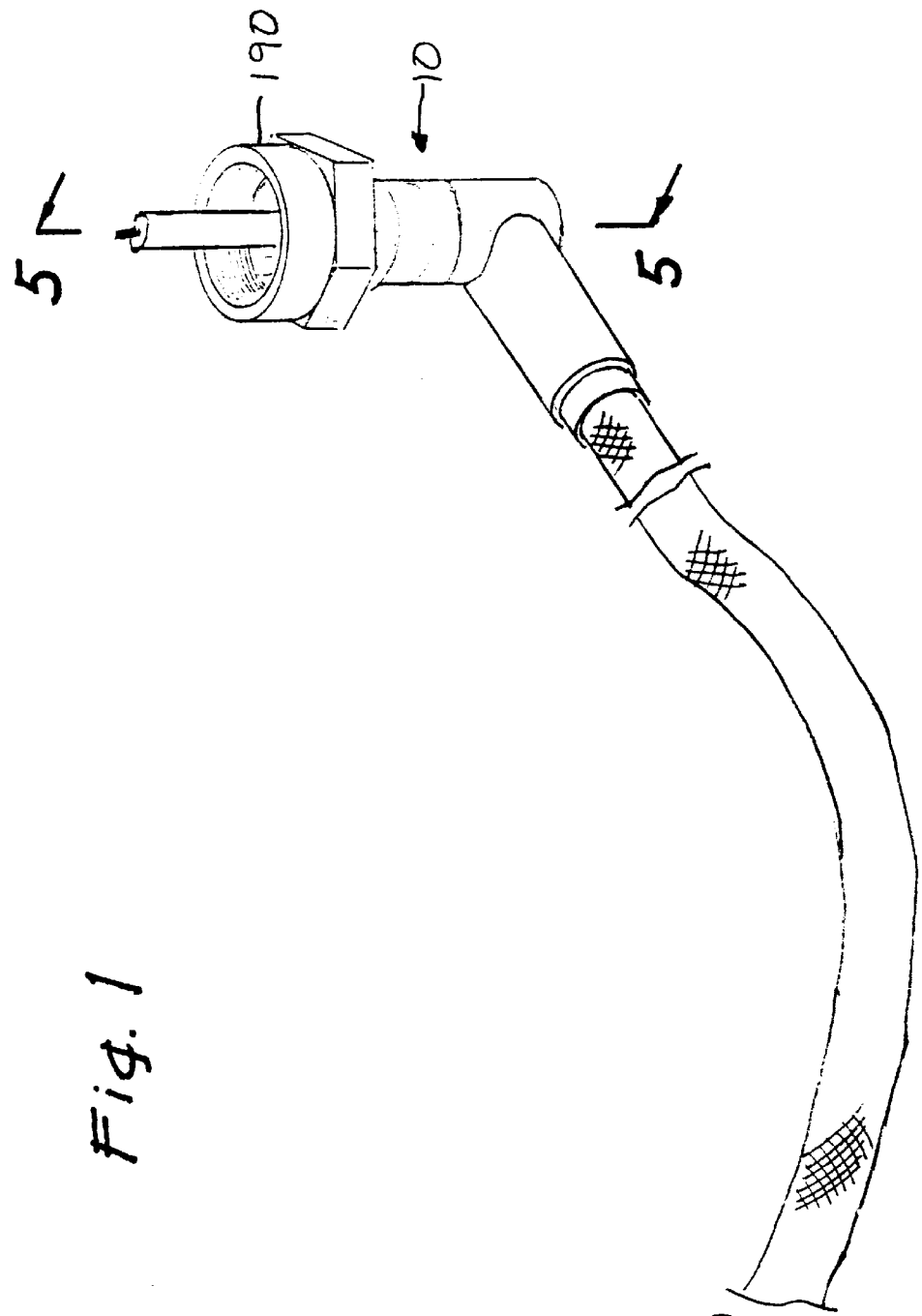
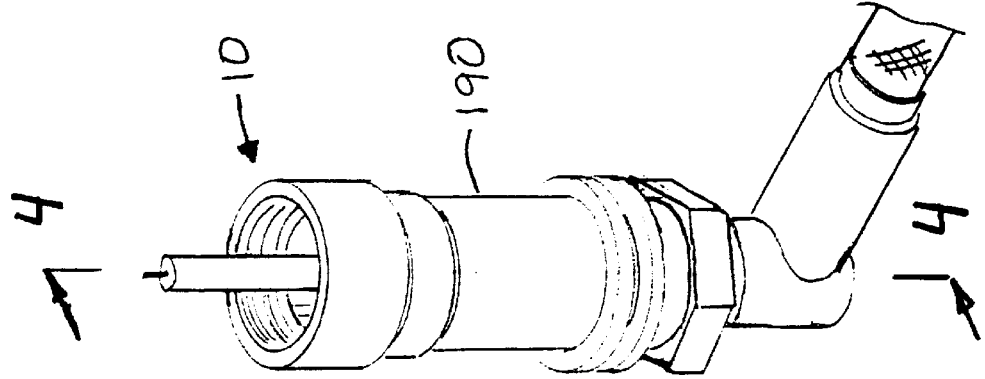
Fig. 1

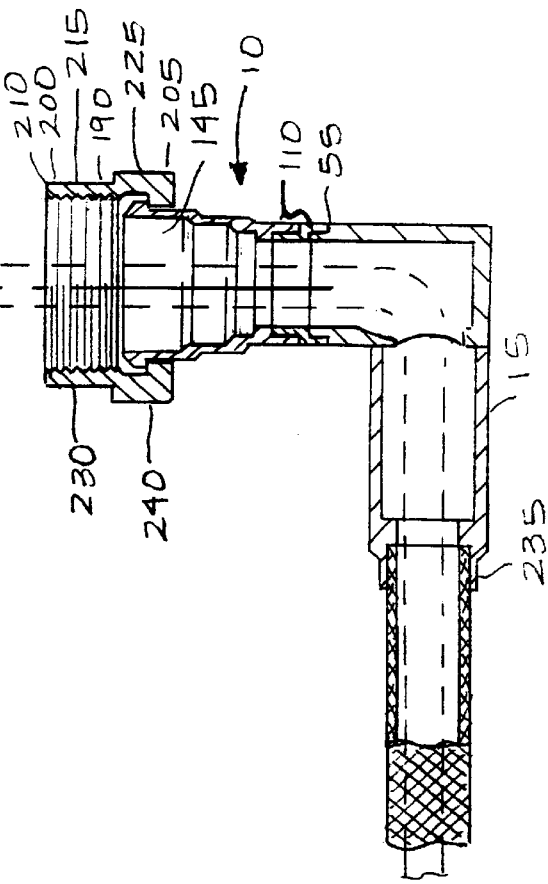
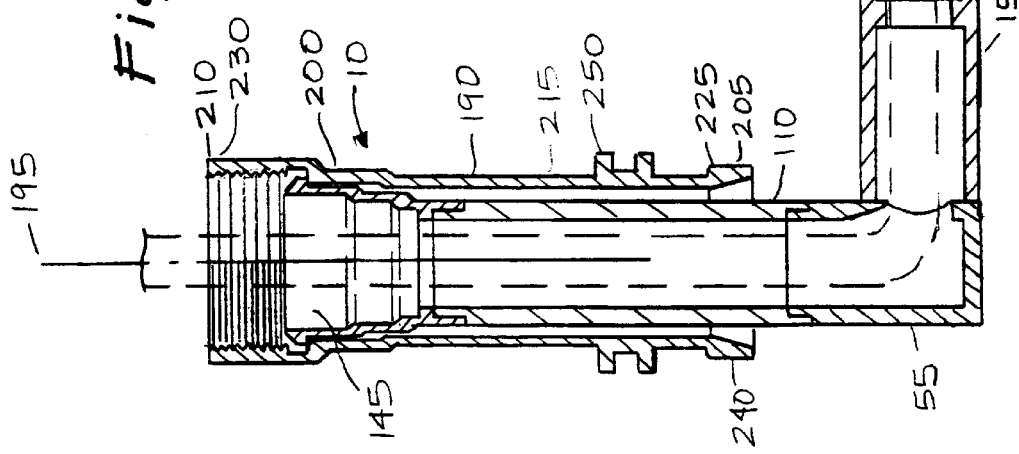

JET ENGINE IGNITER LEAD ELBOW ASSEMBLY

FIELD OF INVENTION

The invention pertains to high voltage ignition cable connectors. More particularly, the invention relates to moisture proof connectors for igniter leads for aircraft jet engines.

BACKGROUND OF THE INVENTION

Various types of high voltage ignition cable connectors and igniter leads have been developed for use in aircraft engines. U.S. Pat. No. 2,114,750 issued to Stone is directed to a radio shielding spark plug connection. The spark plug connection has an outer casing that is brazed to a metallic block that is threaded to receive a nut for forming a liquid tight joint with the ignition wire. The metallic casing is closed at its other end with a side opening adapted to connect with stainless steel cylindrical tube. Casing and tube are secured together at an angle in a suitable manner as by brazing.

U.S. Pat. No. 3,146,301 issued to Logan, is directed to a spark discharge device of the angle type. The spark discharge device has a horizontal connector portion that is covered by a shell. The spark discharge device has a vertical spark gap portion that is covered by a metallic shell. The leg portions are so formed as to meet at an annular junction lying in a plane at degrees with respect to the axis of the legs. With the insulator portion installed, the legs are assembled in a fixture and welded as by welding along the outer surfaces at junction.

U.S. Pat. No. 2,399,402, issued to Spengler is directed to an angular electrical connecting and radio shielding means for coupling a flexible metallic high-tension lead to a spark plug. A pair of cooperating cup-shaped metallic members have matching external flanges that can be positioned in a desired acute angle and soldered or brazed together so that the outlets are in a position suitable for the application.

U.S. Pat. No. 2,463,924 issued to Van Orden describes a shielded right angle spark plug lead. The metal shell body of the spark plug shield comprises a shell body sealed by a dome-shaped structure that is integral. The lower portion of the shell is open and expanded into a hollow hexagonal shape, dimensioned to slide snugly over the hexagonal member of a typical aviation spark plug. An outlet is attached as by soldering to the shell for shielding the opening and it provides an external thread at its end for attachment of a shielded conduit.

U.S. Pat. No. 2,398,359 issued to Curtiss discloses a shielded elbow shell spark plug connector. The spark plug connector has one end connected to an aviation spark plug and the other end connected to an electrical conductor. The connector has a hollow metal elbow or shell that is formed of two complementary pressed sheet metal shell halves brazed together and having a union brazed to end and a retainer is brazed to the spark plug connection arm. The completed metal elbow shell is placed in a die with an electrical conductor or cable connector insert held in spaced relation for a molding operation of plastic insulating material that is forced inside.

While other variations exist, the above-described designs for high voltage ignition cable connectors and igniter leads are typical of those encountered in the prior art. It is an objective of the present invention to provide a securely fastenable jet engine igniter lead elbow assembly that provides superior shielding for radio-frequency signals from high voltage ignition noise. It is a further objective to provide such shielding in an elbow assembly that provides complete sealing against moisture and dirt found in the aviation environment. It is yet a further objective to provide an elbow assembly that may be easily disassembled and reassembled for maintenance purposes without damage to the assembly or the igniter components. It is an additional objective of the invention that the elbow assembly may be easily fabricated from standard and readily available components without resort to tubing bending facilities. It is a final further objective of the invention to provide the above-described capabilities in an inexpensive and durable connector that is capable of extended duty cycles.

While some of the objectives of the present invention are disclosed in the prior art, none of the inventions found include all of the requirements identified.

SUMMARY OF THE INVENTION

The present invention addresses all of the deficiencies of prior art jet engine igniter lead elbow assembly inventions and satisfies all of the objectives described above.

A jet engine igniter lead elbow assembly of the present invention may be constructed from the following components. A saddle adapter is provided. The saddle adapter has a horizontal axis, a cylindrical cross-section of a first predetermined diameter about the horizontal axis, a first end and a second end. A first orifice is provided. The first orifice extends from the first end of the saddle adapter to the second end. A semi-circular cutout is provided. The cutout is located at the first end perpendicular to the horizontal axis. The cutout has a first predetermined radius.

A master cylinder is provided. The master cylinder has a vertical axis and a cylindrical cross-section of the first predetermined diameter about the vertical axis. The master cylinder has an outer surface, a closed lower end, an upper end and a second orifice extending from the closed lower end to the upper end. A circular opening is provided. The circular opening is perpendicular to the vertical axis. The circular opening is located adjacent the closed end lower end of the master cylinder and penetrates the outer surface and extends to the second orifice. A first necked down section is provided. The first necked down section is located at the upper end of the master cylinder and has a second predetermined diameter less that the first predetermined diameter. The first necked down section extends from the upper end toward the lower end for a first predetermined distance. The saddle adapter is removably attached to the master cylinder such that the semi-circular cutout is disposed over the circular opening in the master cylinder with the first orifice adjoining the second orifice.

An extension tube is provided. The extension tube has a vertical axis, a cylindrical cross-section of the first predetermined diameter about the vertical axis, a top end, a bottom end and a third orifice extending from the bottom end to the top end. The bottom end has a first counter bore. The first counter bore is sized and shaped to fit slidably over the first necked down section of the master cylinder. The top end has a second necked down section. The second necked down section has the second predetermined diameter and extends from the top end toward the bottom end for the first predetermined distance.

A ferrule is provided. The ferrule has a vertical axis, a cylindrical cross-section, a first end, a second end and a first portion adjacent the first end of the first predetermined diameter about the vertical axis. A second counter bore is provided. The second counter bore is located at the first end of the ferrule and is sized and shaped to fit slidably over the second necked down section of the extension tube. A restraining lip is provided. The restraining lip is located at the second end of the ferrule and has a third predetermined diameter that is greater than the first predetermined diameter. The ferrule is removably attached at its first end to the top end of the extension tube with the second counter bore fitted slidably over the second necked down section.

A nut extension tube is provided. The nut extension tube has a vertical axis, an outer surface, a first end, a second end and a hollow cylindrical body disposed about the vertical axis. The hollow body has an internal diameter greater than the first predetermined diameter and smaller than the third predetermined diameter. A gripping surface is located at the first end of the nut extension tube and a threaded receiving section is located at the second end. The threaded receiving section is sized and shaped to fit slidably over the ferrule and the thread is sized and shaped to accommodate a fitting on a jet engine.

The nut extension tube is fitted over the extension tube and the ferrule. The top end of the extension tube is removably attached to the master cylinder with the first counter bore fitted slidably over the first necked down section. When the extension tube is removably attached to the master cylinder, the nut extension tube will be slidably and rotably held in place by the ferrule.

In a variant of the invention, the saddle adapter includes a third necked down section. The third necked down section is located at the second end of the saddle adapter and has the second predetermined diameter. The third necked down section extends from the second end of the saddle adapter toward the first end for the first predetermined distance.

In another variant, the saddle adapter is removaby attached to the master cylinder using a method selected from silver soldering and the application of high-strength adhesive.

In still another variant, the extension tube is removaby attached to the ferrule and to the master cylinder using a method selected from silver soldering and the application of high-strength adhesive.

In yet another variant of the invention, the gripping surface includes flattened portions sized, shaped and located so that the nut extension tube may be turned using an open end wrench.

In another variant, the nut extension tube further includes annular rings for handling the nut extension tube.

In a final variant of the invention, the assembly is for use with a Pratt & Whitney JT8D jet aircraft engine.

DESCRIPTION OF THE DRAWINGS

FIG. 1 is a perspective view of two embodiments of the invention assembled with an igniter lead;

FIG. 4 is a cross-sectional view of the FIG. 2 embodiment assembled with an igniter lead and connector nut taken along the line 4—4;

FIG. 5 is a cross-sectional view of the FIG. 3 embodiment assembled with an igniter lead and connector nut taken along the line 5—5;

DETAILED DESCRIPTION OF THE PREFERRED EMBODIMENT

Figure 2:
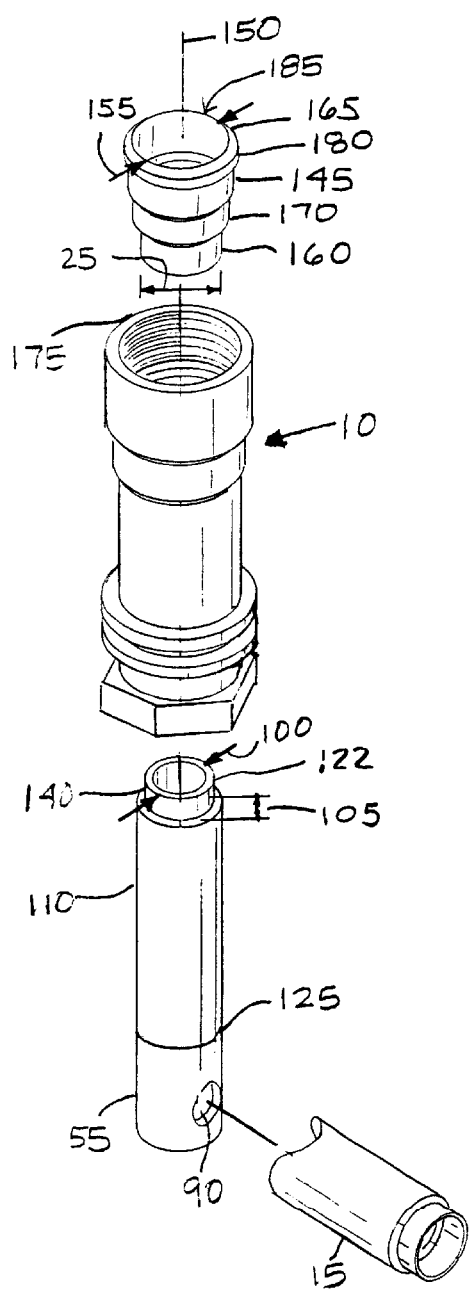
FIG. 2 is an exploded perspective view of a long extension tube embodiment of the invention.

FIGS. 1–6 illustrate a jet engine igniter lead elbow assembly 10 of the present invention that may be constructed from the following components. A saddle adapter 15 is provided. The saddle adapter 15 has a horizontal axis 20, a cylindrical cross-section 22 of a first predetermined diameter 25 about the horizontal axis 20, a first end 30 and a second end 35. A first orifice 40 is provided. The first orifice 40 extends from the first end 30 of the saddle adapter 15 to the second end 35. A semi-circular cut-out 45 is provided. The cut-out 45 is located at the first end 30 perpendicular to the horizontal axis 20. The cut-out 45 has a first predetermined radius 50.

A master cylinder 55 is provided. The master cylinder 55 has a vertical axis 60 and a cylindrical cross-section 65 of the first predetermined diameter 25 about the vertical axis 60. The master cylinder 55 has an outer surface 70, a closed lower end 75, an upper end 80 and a second orifice 85 extending from the closed lower end 75 to the upper end 80. A circular opening 90 is provided. The circular opening 90 is perpendicular to the vertical axis 60. The circular opening 90 is located adjacent the closed lower end 75 of the master cylinder 55 and penetrates the outer surface 70 and extends to the second orifice 85. A first necked down section 95 is provided. The first necked down section 95 is located at the upper end 80 of the master cylinder 55 and has a second predetermined diameter 100 less that the first predetermined diameter 25. The first necked down section 95 extends from the upper end 80 toward the lower end 75 for a first predetermined distance 105. The saddle adapter 15 is removably attached to the master cylinder 55 such that the semi-circular cut-out 45 is disposed over the circular opening 90 in the master cylinder 55 with the first orifice 40 adjoining the second orifice 85.

An extension tube 110 is provided. The extension tube 110 has a vertical axis 115, a cylindrical cross-section 120 of the first predetermined diameter 25 about the vertical axis 115, a top end 122, a bottom end 125 and a third orifice 130 extending from the bottom end 125 to the top end 122. The top end 122 has a first counter bore 135. The first counter bore 135 is sized and shaped to fit slidably over the first necked down section 95 of the master cylinder 55. The top end 122 has a second necked down section 140. The second necked down section 140 has the second predetermined diameter 100 and extends from the bottom end 125 toward the top end 122 for the first predetermined distance 105.

Figure 3:
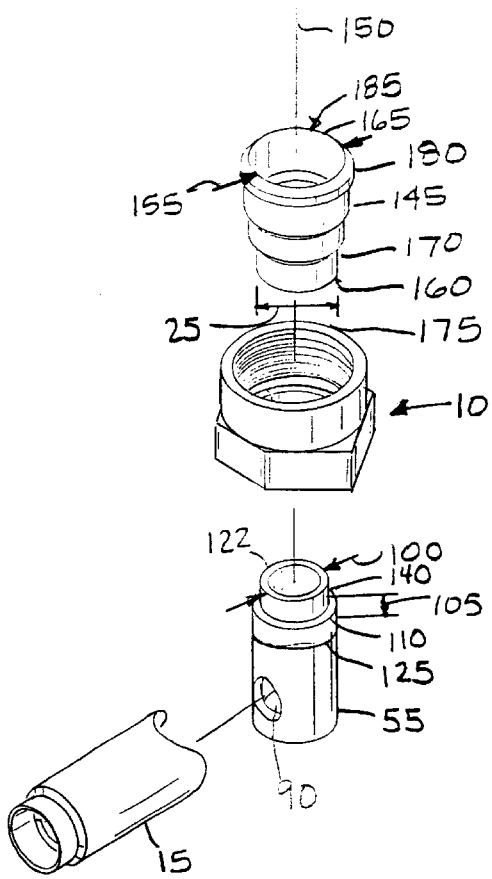
FIG. 3 is an exploded perspective view of a short extension tube embodiment of the invention.
Figure 4A:
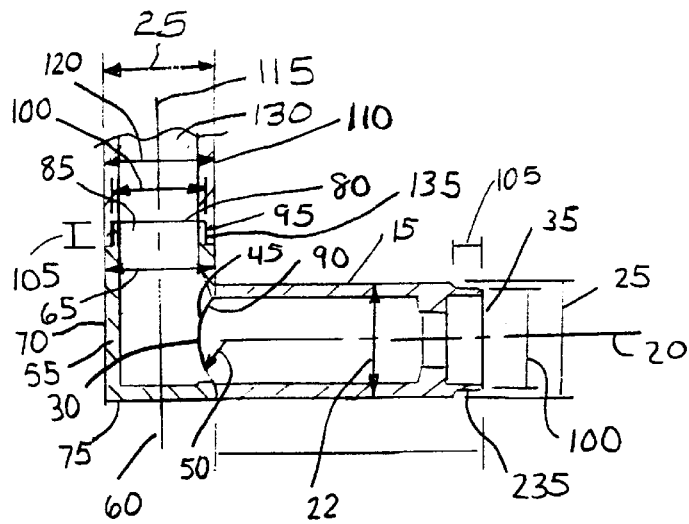
FIG. 4A is a cross-sectional view of the FIG. 2 embodiment detailing the joining of the components.
Figure 4B:
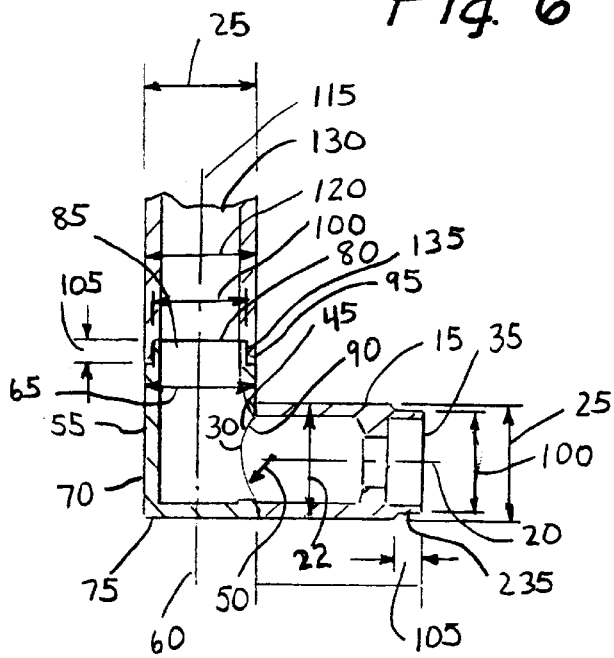
FIG. 4B is a cross-sectional view of the FIG. 3 embodiment detailing the joining of the components.
Figure 6:
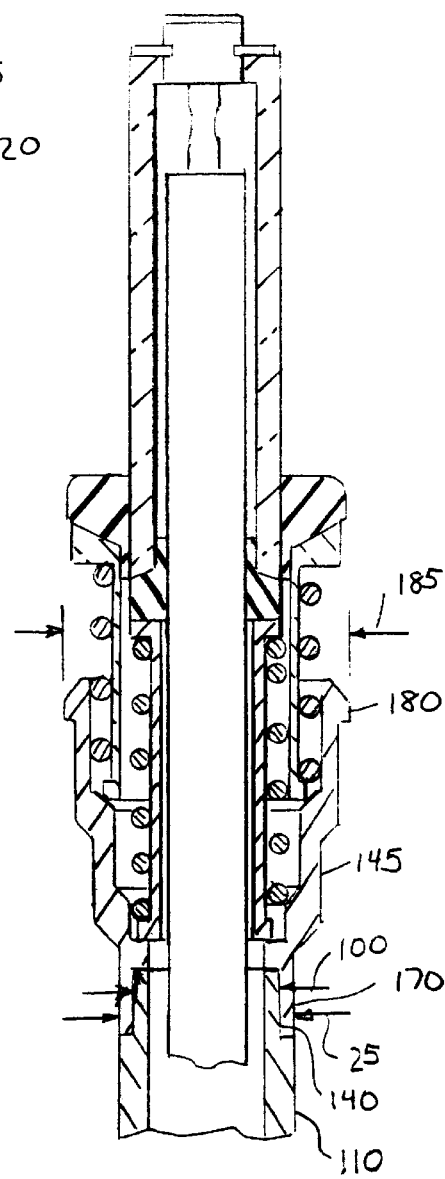
FIG. 6 is a cross-sectional view of a fully assembled igniter lead illustrating the electrical components of the lead.

A ferrule 145, as illustrated in FIGS. 3–5, is provided. The ferrule 145 has a vertical axis 150, a cylindrical cross-section 155, a first end 160, a second end 165 and a first portion 170 adjacent the first end 160 of the first predetermined diameter 25 about the vertical axis 150. A second counter bore 175 is provided. The second counter bore 175 is located at the first end 160 of the ferrule 145 and is sized and shaped to fit slidably over the second necked down section 140 of the extension tube 110. A restraining lip 180 is provided. The restraining lip 180 is located at the second end 165 of the ferrule 145 and has a third predetermined diameter 185 that is greater than the first predetermined diameter 25. The ferrule 145 is removably attached at its first end 160 to the top end 122 of the extension tube 110 with the second counter bore 175 fitted slidably over the second necked down section 140.

A nut extension tube 190, as illustrated in FIGS. 4 and 5, is provided. The nut extension tube 190 has a vertical axis 195, an outer surface 200, a first end 205, a second end 210 and a hollow cylindrical body 215 disposed about the vertical axis 195. The hollow body 215 has an internal diameter 220 greater than the first predetermined diameter 25 and smaller than the third predetermined diameter 185. A gripping surface 225 is located at the first end 205 of the nut extension tube 190 and a threaded receiving section 230 is located at the second end 210. The threaded receiving section 230 is sized and shaped to fit slidably over the ferrule 145 and the thread 235 is sized and shaped to accommodate a fitting (not shown) on a jet engine (not shown).

The nut extension tube 190 is fitted over the extension tube 110 and the ferrule 145. The top end 120 of the extension tube 110 is removably attached to the master cylinder 55 with the first counter bore 135 fitted slidably over the first necked down section 95. When the extension tube 110 is removably attached to the master cylinder 55, the nut extension tube 190 will be slidably and rotably held in place by the ferrule 145.

In a variant of the invention, as illustrated in FIGS. 4, 4A, 5 and 5A, the saddle adapter 15 includes a third necked down section 235. The third necked down section 235 is located at the second end 35 of the saddle adapter 15 and has the second predetermined diameter 100. The third necked down section 235 extends from the second end 35 of the saddle adapter 15 toward the first end 30 for the first predetermined distance 105.

In another variant, the saddle adapter 15 is removaby attached to the master cylinder 55 using a method selected from silver soldering and the application of high-strength adhesive.

In still another variant, the extension tube 110 is removaby attached to the ferrule 145 and to the master cylinder 55 using a method selected from silver soldering and the application of high-strength adhesive.

In yet another variant of the invention as illustrated in FIG. 1, the gripping surface 225 includes flattened portions 240 sized, shaped and located so that the nut extension tube 190 may be turned using an open end wrench 245.

In another variant, as illustrated in FIG. 4, the nut extension tube 190 further includes annular rings 250 for handling the nut extension tube 190.

In a final variant of the invention, the assembly 10 is for use with a Pratt & Whitney JT8D jet aircraft engine (not shown).

The jet engine igniter lead elbow assembly 10 has been described with reference to particular embodiments. Other modifications and enhancements can be made without departing from the spirit and scope of the claims that follow.

What is claimed is:

1. A jet engine igniter lead elbow assembly, comprising:
   a saddle adapter, said saddle adapter having a horizontal axis, a cylindrical cross-section of a first predetermined diameter about said horizontal axis, a first end and a second end;
   a first orifice extending from said first end to said second end;
   a semi-circular cut-out disposed at said first end perpendicular to said horizontal axis, said cut-out having a first predetermined radius;
   a master cylinder, said master cylinder having a vertical axis, a cylindrical cross-section of the first predetermined diameter about said vertical axis, an outer surface, a closed lower end, an upper end and a second orifice extending from said closed lower end to said upper end;
   a circular opening, said circular opening being perpendicular to said vertical axis, disposed adjacent said closed lower end and penetrating said outer surface and extending to said second orifice;
   a first necked down section, said first necked down section disposed at said upper end, having a second predetermined diameter less that said first predetermined diameter and extending from said upper end toward said lower end for a first predetermined distance;
   said saddle adapter being removably attached to said master cylinder such that said semi-circular cut-out is disposed over said circular opening in said master cylinder with said first orifice adjoining said second orifice;
   an extension tube, said extension tube having a vertical axis, a cylindrical cross-section of the first predetermined diameter about said vertical axis, a top end, a bottom end and a third orifice extending from said bottom end to said top end;
   said bottom end having a first counter bore, said first counter bore being sized and shaped to fit slidably over said first necked down section of said master cylinder;
   said top end having a second necked down section, said second necked down section having the second predetermined diameter and extending from said top end toward said bottom end for the first predetermined distance;
   a ferrule, said ferrule having a vertical axis, a cylindrical cross-section, a first end, a second end and a first portion adjacent said first end of the first predetermined diameter about said vertical axis;
   a second counter bore, said second counter bore be disposed at said first end of said ferrule and being sized and shaped to fit slidably over said second necked down section of said extension tube;
   a restraining lip, said restraining lip being disposed at said second end of said ferrule and having a third predetermined diameter greater than said first predetermined diameter;
   said ferrule being removably attached at its first end to said top end of said extension tube with said second counter bore fitted slidably over said second necked down section;
   a nut extension tube, said nut extension tube having a vertical axis, an outer surface, a first end, a second end and a hollow cylindrical body disposed about said vertical axis, said hollow body having an internal diameter greater than said first predetermined diameter and smaller than said third predetermined diameter;
   a gripping surface disposed at said first end of said nut extension tube and a threaded receiving section at said second end;
   said threaded receiving section being sized and shaped to fit slidably over said ferrule and said thread being sized and shaped to accommodate a fitting on a jet engine;
   said nut extension tube being fitted over said extension tube and said ferrule;
   said top end of said extension tube being removably attached to said ferrule with said second counter bore fitted slidably over said second necked down section; and whereby when said extension tube is removably attached to said master cylinder, said nut extension tube will be slidably and rotably held in place by said ferrule.

2. A jet engine igniter lead elbow assembly as described in claim 1, wherein said saddle adapter further includes a third necked down section, said third necked down section disposed at the second end of said saddle adapter and having the second predetermined diameter and extending from said second end toward said first end for the first predetermined distance.

3. A jet engine igniter lead elbow assembly as described in claim 1, wherein said saddle adapter is removaby attached to said master cylinder using a method selected from:

silver soldering and application of high-strength adhesive.

4. A jet engine igniter lead elbow assembly as described in claim 1, wherein said extension tube is removaby attached to said ferrule and to said master cylinder using a method selected from:

silver soldering and application of high-strength adhesive.

5. A jet engine igniter lead elbow assembly as described in claim 1, wherein said gripping surface includes flattened portions sized, shaped and disposed so that the nut extension tube may be turned using an open end wrench.

6. A jet engine igniter lead elbow assembly as described in claim 1, wherein said nut extension tube further includes annular rings for handling said nut extension tube.

7. A jet engine igniter lead elbow assembly as described in claim 1, wherein said assembly is for use with a Pratt & Whitney JT8D jet aircraft engine.

* * * * *